MAGNETIC RECORDING ELEMENT AND METHOD FOR PREPARING SAME

Filed Nov. 15, 1966

INVENTOR
Manuel Slovinsky
BY [signature]
Attorney

United States Patent Office 3,490,945

Patented Jan. 20, 1970

3,490,945

MAGNETIC RECORDING ELEMENT AND METHOD FOR PREPARING SAME

Manuel Slovinsky, Fanwood, N.J., assignor to RCA Corporation, a corporation of Delaware Filed Nov. 15, 1966, Ser. No. 594,549
Int. Cl. C04b *35/00*
U.S. Cl. 117—235 8 Claims

ABSTRACT OF THE DISCLOSURE

A magnetic recording element comprising a base with a coating consisting essentially of magnetic particles in a polymeric binder derived from a surface-active tertiary amine-containing diisocyanate terminated prepolymer.

This invention relates to an improved magnetic recording element of the type comprising a base having a coating of magnetic particles in a diisocyanate-derived polymeric binder. The invention includes novel methods for preparing the improved recording element.

One type of magnetic recording element, which is referred to as magnetic tape, is comprised of a flexible base or tape having a surface coated with magnetic particles in a synthetic polymeric binder. A magnetic tape of the type which used a diisocyanate-derived binder is described in U.S. Patent 3,150,995, issued Sept. 29, 1964 to Herbert Bauer. The magnetic coating on this magnetic tape has good mechanical strength and good abrasion resistance. To achieve the maximum magnetic performance, it is desirable that the coating contain the maximum volume loading of magnetic particles. However, at high volume loadings, the magnetic particles in the coating are not adequately dispersed, and when there is poor particle dispersion the magnetic tape exhibits less than maximum magnetic performance. Hence, in practical tapes less than maximum volume loading is used. As a result, the flux density at saturation ($B_s$), and the retentivity ($B_r$) are lower than optimum and the value of $B_r/B_s$ (which is a measure of the amount of retained signal) is lower than desirable. It is therefore, desirable to obtain improved dispersion of the magnetic particles in the coating.

A property of magnetic tapes, important in tapes to be used at high speeds, such as use in high speed computers, is the electrical resistivity of the coating surface. A low resistivity is desirable. Prior magnetic tapes for use at high speed generally include carbon particles in the coatings to reduce the surface resistivity. This also reduces the volume loading of magnetic particles in the tape.

Prior methods of producing magnetic recording elements having diisocyanate based coatings include the step of preparing a coating mixture comprised of magnetic particles dispersed in a diisocyanate-terminated prepolymer. Generally, the coating mixture includes a separate surface active agent and a chain extending and/or cross-linking agent for curing the prepolymer. The coating mixture is applied to a base, dried and then cured. Improved dispersion is desired as compared to that obtained with a separate surface active agent. In addition, moisture curing of these prior art tape coatings may take several days and/or generally require higher than atmospheric humidity and higher than room temperature.

An object of this invention is to provide an improved magnetic recording element.

A further object is to provide a magnetic recording element having an improved dispersion of magnetic particles and a higher retentivity than similar prior art recording elements.

Another object is to provide a novel recording element which has a reduced coating resistivity.

Still another object is to provide novel methods for preparing the improved magnetic recording element.

In general, the novel magnetic recording element is comprised of a base having a novel magnetic coating thereon. The coating is comprised of magnetic particles in a diisocyanate-derived polymeric binder, characterized in that molecules of the binder are constituted of interconnected units containing at least one tertiary amine function. A tertiary amine function as used herein is a nitrogen atom which is bonded to three carbon atoms, wherein said carbon atoms are further bonded to either hydrogen atoms and/or other carbon atoms.

By virtue of the tertiary amine function as part of the binder molecule, the coatings of the recording elements disclosed herein are superior to similar prior art coatings. This is due to a more uniform dispersion of the magnetic particles in the novel coating. This results in a binder system having the ability to take a higher volume loading of magnetic particles giving tapes with higher retentivity, and higher magnetic flux density at saturation than prior art magnetic tapes having coatings comprised of diisocyanate-derived polymeric binders. Further improvement in retentivity and improvement in the resistivity of the magnetic tape can be achieved by incorporating quaternary nitrogen groups in a proportion of the interconnected molecular units. Incorporation of such groups also improves the blocking qualities of the magnetic tape. The coating of the novel recording element otherwise exhibits mechanical strength and abrasion resistance at least as good as similar prior art coatings.

In the method of preparing the magnetic tape, magnetic particles are dispersed in a nonaqueous solution of an isocyanate-terminated prepolymer containing at least one tertiary amine function to form a coating mixture. The coating mixture is then applied upon a base to form a coating. The coating is then dried to remove the solvent and the dried coating is cured.

It has been found that isocyanate-terminated prepolymers which contain tertiary amine functions are excellent surfactive agents for dispersing inorganic particles having an electron attracting group on its surface. In particular, these prepolymers are excellent dispersing agents for magnetic particles of metals and oxides such as acicular iron oxide, chromium dioxide and ferrites. In addition, the tertiary nitrogen in the prepolymer acts as a catalyst for curing the prepolymer. Hence, the prior art practice of adding separate surfactive agents and/or catalysts to the coating mixture may be eliminated. Also, curing with atmospheric water vapor takes place in about 24 hours at room temperature, due to the tertiary amine catalysis. Hence, the necessity of higher than room temperature and higher than normal atmospheric humidity is eliminated.

Figure 1:
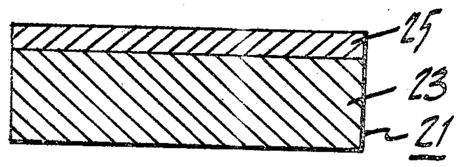
FIGURE 1 is a sectional view of a typical novel recording element.

The novel recording element 21 illustrated in FIGURE 1 comprises a base 23 and a coating 25 of magnetic particles in a diisocyanate-derived polymeric binder, the molecules of said binder being constituted of interconnected units containing at least one tertiary amine function.

The base 23 functions as a support for the entire structure. The particular base 23 is an oriented polyethylene terephthalate (Mylar) film. Other suitable bases include bases made of paper, cellulose acetate and oriented polyvinyl chloride. The base 23 is typically 1.5 mils thick, although other thicknesses, preferably between 0.50 and 2.5 mils may be used. The base 23 may be any width, for example, between 0.25 and 2.0 inches wide, and may be of any length, usually thousands of feet long.

Any of the usual magnetic particles may be used in the novel recording elements. For example, one may use metallic particles, such as iron particles, or preferably oxidic particles such as gamma iron oxide, chromium dioxide or a ferrite such as zinc ferrous ferrite. The magnetic particles are preferably acicular in shape and between 0.2 and 2.0 microns long with an average length to width ratio of about 2 to 20. The preferred embodiment employs gamma iron oxide as the magnetic material.

The binder for the coating 25 is a feature of the invention. Generally, prior art coating compositions and binders do not satisfy all of the necessary requirements nor exhibit the high performance characteristics desired for use of the recording elements in electronic data processing equipment. For such use, the coatings must be abrasion resistant, flexible, resilient, and strongly adherent to the base. In addition, the coatings should provide a uniform dispersion and allow high volume loadings of the magnetic particles. The magnetic recording elements should have few or no dropouts, high retentivities and high flux density at saturation. The novel coatings 25 and recording elements 21 provide the above desired properties.

The diisocyanate-derived elastomers used in the novel magnetic recording elements consist essentially of units represented by the formula (1)

$$\left[-NX-\left(R-NH-\overset{\overset{O}{\|}}{C}-O-(B)_n-E-(B)_n-O-\overset{\overset{O}{\|}}{C}-NH\right)_m-(R-NX-Y)_t-\right]$$

or the formula (2)

$$\left[-NX-\left(\left[R-NH-\overset{\overset{O}{\|}}{C}-O-(B)_n-O-\overset{\overset{O}{\|}}{C}-NH-\right]_m-R-NH-\overset{\overset{O}{\|}}{C}-O-E-O-\overset{\overset{O}{\|}}{C}-NH-\right)_p-\left[R-NH-\overset{\overset{O}{\|}}{C}-O-(B)_n-O-\overset{\overset{O}{\|}}{C}-NH\right]_m-\left[R-NX-Y\right]_t-\right]$$

wherein: E is a radical of low molecular weight containing at least one tertiary amine function; B is a bivalent radical selected from the group consisting of alkylene radicals, alkyleneether radicals, alkylene-aryleneether radicals, alkylene-thioether radicals, alkylene-arylene-thioether radicals, ester radicals and esteramide radicals; *n* is an integer from 1 to 50; R is a bivalent, nonpolymeric, organic radical which is inert to isocyanate groups and which is selected from the group consisting of aromatic, aliphatic and cycloaliphatic radicals and combinations thereof; X is at least one radical selected from the group consisting of hydrogen, nonpolymeric dicarbamyl radicals and of polymeric dicarbamyl radicals where said polymeric dicarbamyl radicals have the general formula $$-\overset{\overset{O}{\|}}{C}-NH-\left(R-NH-\overset{\overset{O}{\|}}{C}-O-(B)_n-E-(B)_n-O-\overset{\overset{O}{\|}}{C}-NH-\right)_m-R-NH-\overset{\overset{O}{\|}}{C}-$$

when the elastomer has the formula represented by Formula 1 above, and where said polymeric dicarbamyl radicals have the formula $$-\overset{\overset{O}{\|}}{C}-NH-\left(\left[R-NH-\overset{\overset{O}{\|}}{C}-O-(B)_n-O-\overset{\overset{O}{\|}}{C}-NH-\right]_m-R-NH-\overset{\overset{O}{\|}}{C}-O-E-O-\overset{\overset{O}{\|}}{C}-NH\right)_p-\left[R-NH-\overset{\overset{O}{\|}}{C}-O-(B)_n-O-\overset{\overset{O}{\|}}{C}-NH-\right]_m-R-NH-\overset{\overset{O}{\|}}{C}-$$

when the elastomer has the formula represented by Formula 2 above; Y is a bivalent radical selected from the group consisting of carbonyl radicals, non-polymeric diacyl radicals and nonpolymeric dicarbamyl radicals; *m*, *p* and *t* are integers and the ratio *m/t* is in the range from 1 to 1000 in Formula 1 and the ratio of *p/t* is in the range from 1 to 1000 in Formula 2; and, C, O, N and H are the standard chemical symbols for carbon, oxygen, nitrogen and hydrogen, respectively.

There is a wide variety of radicals that have been found useful in diisocyanate-derived elastomers for recording elements which are included in the embodiments of this invention. U.S. Patents 3,150,995, issued to Herbert Bauer, describes many such radicals useful in the elastomer composition. The above described interconnected units generally have a molecular weight of from about 300 to 8000. In the preferred embodiment which is represented by Formula 1: E is a 1,4-diethylpiperazine radical; B is an ester derived from the reaction of caprolactone and 1,4-bis(hydroxyethyl)-piperazine; n is 1 to 10; R is a 2,4-tolylene radical; Y is a carbonyl radical or a non-polymeric dicarbamyl radical; X is comprised of hydrogen and a polymeric carbamyl radical of the type described; and *m* is 1 to 5.

Other embodiments of the radical E useful in the novel elastomer compositions are for example, substituted 1,4-bis(2-hydroxyethyl)-piperazine, O,O'-diethyl-N,N - bis(2-hydroxyethyl)-aminomethylphosphonate, and N - methyldiethylamine radicals.

It has been found that an improvement in surface electrical resistivity and a further improvement in retentivity of the magnetic recording element can be realized when a proportion of the interconnected units contain quaternized nitrogen groups. Such quaternary nitrogen groups can be produced for example by adding $\alpha,\alpha'$-dichloro-p-xylene to the prepolymer having a tertiary amine function therein.

The recording element of the invention may be prepared in several steps. First, a coating mixture is prepared by dispersing magnetic particles in a nonaqueous solution of an isocyanate-terminated prepolymer having the general formula O=C=N—A—N=C=O wherein A is a bivalent organic radical containing at least one tertiary amine function and having a molecular weight between about 300 and 8000. Then, the coating mixture is applied upon a base to form a coating upon the base. The coating is then dried and then cured. It is preferred to include the step of aligning the magnetic particles by passing the base containing the coating mixture prior to drying through a magnetic field.

Prior to this novel method, a surfactive agent, a curing agent and/or a catalyst were essential components of the coating mixture. The surface active agent was needed to obtain adequate dispersion of the magnetic particles in the binder. The catalyst was needed to accelerate curing. If a catalyst for moisture curing was not added, curing would have to be accomplished under heat and high moisture conditions for extended period of time which adversely affected the recording element. The addition of the surface active agent and/or curing agent may sometimes adversely affect some of the properties of the recording element. Their addition also lowers the volume loading. The novel method overcomes these difficulties by using a diisocyanate prepolymer characterized in that it contains at least one tertiary amine function. The tertiary amine function which is a part of the prepolymer provides sites that absorb on the surface of the magnetic particles, leading to thorough wetting of the particles. By virtue of the above, the prepolymer is itself a surface active agent and provides a coating mixture having superior uniform dispersion of the magnetic particles. In addition, after drying the coating, the tertiary amine functions act as catalysts for curing the coating. The curing step in the novel method can be completed in a short time (several hours to overnight) at room temperature and with atmospheric moisture. It should also be noted that the base containing the dried coating can immediately be rolled on a reel and stored for use. Curing will take place while the tape is on the reel with no blocking problems.

The featured isocyanate-terminated prepolymers useful in producing the novel recording element may be represented by the general formula O=C=N—A—N=C=O.

The bivalent tertiary amine containing radical, A, can be further represented by the formulas:

$$\text{(3)}\quad -\left[R-NH-\overset{\underset{\|}{O}}{C}-O-(B)_n-E-(B)_n-O-\overset{\underset{\|}{O}}{C}-NH\right]_m-R-$$

or $$\text{(4)}\quad -\left[R-\left(NH-\overset{\underset{\|}{O}}{C}-O-(B)_n-O-\overset{\underset{\|}{O}}{C}-NH-R\right)_m-NH-\overset{\underset{\|}{O}}{C}-O-E-O-\overset{\underset{\|}{O}}{C}-NH-R\right]_p-\left[NH-\overset{\underset{\|}{O}}{C}-O-(B)_n-O-\overset{\underset{\|}{O}}{C}-NH-R\right]_m-$$

wherein: E is a radical of low molecular weight containing at least one teritary amine function; B is a bivalent radical selected from the group consisting of alkylene radicals, alkyleneether radicals, alkylene-aryleneether radicals, alkylene-thioether radicals, alkylene-arylene-thioether radicals, ester radicals and esteramide radicals; $n$ is an integer from 1 to 50; R is a bivalent, nonpolymeric, organic radical which is inert to isocyanate groups and which is selected from the group consisting of aromatic, aliphatic and cycloaliphatic radicals and combinations thereof. In the preferred prepolymer the radical A is represented by Formula 3 wherein: E is a 1,4-diethylpiperazine radical; B is a caproic acid ester radical derived from the reaction of caprolactone and 1,4-bis(2-hydroxyethyl)-piperazine; $n$ is 1 to 10; R is a 2,4-tolylene radical; and $m$ is 1 to 5.

Other embodiments of the tertiary amine-containing radical E, useful in the novel propolymer compositions include, for example, radicals derived from, substituted 1,4-bis-(2-hydroxyethyl)-piperazine, 1,4-bis(2 - hydroxypropyl)-2-methylpiperazine, O,O' - diethyl-N,N-bis(2-hydroxyethyl)-aminomethylphosphonate and N-methyldiethanolamine.

The isocyanate-terminated prepolymer used in making the novel recording element may be produced in one of several ways. In one method a molar excess of a diisocyanate-terminated prepolymer may be reacted with a molecule which contains at least one tertiary amine function and is terminated with groups reactive with the isocyanate groups of the prepolymer. For example, a glycol which contains a tertiary amine function. This reaction results in the desired diisocyanate-terminated prepolymer having a tertiary amine group as an integral part thereof.

In another method, the tertiary amine-containing prepolymer may be prepared in the following manner. A low molecular weight glycol having at least one tertiary amine function, is reacted with a compound so as to produce a resultant compound having polymeric or nonpolymeric alkylene, alkyleneether, alkylene-aryleneether, alkylene-thioether, alkylene-arylene-thioether, ester or esteramide radicals bonded to a tertiary amine containing radical and which resultant compound is terminated with a group reactive with isocyanate groups. Examples of such a compound reactive with the glycol include ethylene oxide, propylene oxide, tetrahydrofuran and caprolactone. The resultant compound is then reacted with a molar excess of a non-polymeric diisocyanate to yield the desired diisocyanate terminated prepolymer containing tertiary amine groups as an integral part thereof.

Examples of the preparation of the features prepolymers are as follows:

EXAMPLE 1

The following materials are charged in a dry three neck flask, protected from outside moisture and provided with a stirrer and thermometer: 0.1 mole of an 890 molecular weight isocyanate-terminated prepolymer, such as the one obtained by reacting 2 mole of tolylene diisocyanate with 1 mole of polytetramethyleneether glycol; 0.05 mole of a glycol containing at least one tertiary amine function such as N,N' - bis(2 - hydroxyethyl) - piperazine; and 97.7 g. of dry methylethyl ketone, which acts as the solvent. The mixture is stirred at 58–65° C. for 3.5 hours whereby a homogeneous solution of the featured prepolymer is obtained.

When preparing the featured prepolymer by the above method, it is preferred that the molar ratio of prepolymer to glycol be between 2:1 and 5:4 such that the number of moles of prepolymer exceeds the number of moles of glycol by one.

EXAMPLE 2

The following materials are charged in a three neck flask provided with a stirrer, thermometer and condenser: ε-caprolactone 114.0 grams (1 mole); N,N' - bis(2 - hydroxyethyl) - piperazine 28.9 grams (0.166 mole); and benzene 50 milliliters. The mixture is gradually heated until no more benzene distills. The temperature is then raised and maintained between 170° C. and 200° C. for 5.5 hours. Vacuum is then applied to the flask for 2 hours. The reaction mass is then dissolved in benzene, treated with decolorizing charcoal and filtered. The benzene is then removed by distillation. Analysis of the macrodiol thus obtained shows about 3.9 percent wt. hydroxyl.

A solution of 70.4 grams of the above macrodiol dissolved in 148.2 grams of 1,1,2 - trichloroethane is then caused to react with 28.4 grams of tolylene - 2,4 - diisocyanate while maintaining the temperature at 20–25° C. The product of this reaction is an isocyanate-terminated prepolymer containing two tertiary amine functions in the form of a piperazine ring as an integral part thereof.

It should be noted that the chain length and molecular weight of the prepolymer in Example 2 can be controlled by selection of the mole ratio of ε-caprolactone to N,N'-bis(2 - hydroxyethyl) - piperazine. It is preferred that the mole ratio be selected so that, in the ester portion of the molecule formed from the reaction, namely that portion represented by the formula $$[(CH_2)_5\overset{\underset{\|}{O}}{C}-O]_n$$

$n$ be between 1 and 10.

EXAMPLE 3

The same procedure is followed as in Example 2 except that a 4 to 1 mole ratio of ε-caprolactone to N,N'-bis(2 - hydroxyethyl) - piperazine is reacted to form a macrodiol. A 299.2 gram fraction of the macrodiol dissolved in 690.8 grams of 1,1,2 - trichloroethane is caused to react with 161.3 grams of the tolylene - 2,4 - diisocyanate.

EXAMPLE 4

The same procedure is followed as in Example 3 except that 185.3 grams of the macrodiol dissolved in 417.4 grams of trichloroethane is caused to react with 92.9 grams of tolylene 2,4 - diisocyanate. In this example the ratio of macrodiol to diisocyanate is somewhat different than in Example 3.

EXAMPLE 5

A solution of 89.4 grams of the isocyanate-terminated prepolymer of molecular weight 894 as in Example 1 in 80 grams of dry methylethyl ketone is gradually added to a 12.32 gram quantity of O,O'-diethyl-N,N'(2-hydroxyethyl)aminomethylphosphonate (commercially available as Fyrol 6 manufactured by the Stauffer Chemical Company) dissolved in 21.7 grams of dry methylethyl ketone while maintaining the temperature at about 5° C. The reaction mixture is then kept at room temperature for 24 hours. The resultant product is a solution of a featured tertiary amine containing prepolymer.

EXAMPLE 6

A solution of 89.4 grams of the isocyanate terminated of molecular weight 894 as in Example 1 in 95.35 grams of methylethyl ketone is gradually added to 5.95 grams of N-methyldiethanolamine while maintaining the temperature at about 10° C. The reaction mixture is then kept at room temperature for 24 hours. The resultant product is a solution of a featured tertiary amine containing prepolymer.

Figure 2:
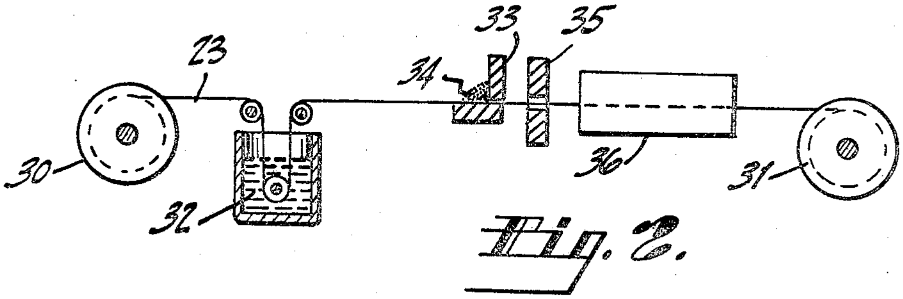
FIGURE 2 is a partially schematic side view of an apparatus for practicing the process of the invention.

The recording element 21 illustrated in FIGURE 1 may be prepared by the following process which may be carried out in the continuous process apparatus of FIGURE 2.

A base 23 of oriented polyethylene terephthalate film is provided in the form of a roll. The film is unwound from a feeder roller 30 and passes, in order, through a washing station, a coating station, an orienting station and a drying region, and then is wound on a take-up roller 31. The film 23 passes through the apparatus at any convenient speed. Speeds between 10 and 200 feet per minute may be used.

At the washing station, the base 23 passes through a non-aqueous solvent 32 such as dichloroethane to clean the surface of the film 23. This washing step is optional. At the coating station, the base 23 passes under a doctor blade or knife 33, which has a quantity of a coating mixture 34 behind it. The coating mixture 34 comprises a dispersion of magnetic particles in a non-aqueous solution of the feature prepolymer. The coating mixture 34 is applied to the surface of the base 23 to provide a coating which when dried will be between about 0.1 and 2.0 mils thick. The coating mixture may be applied by any standard coating technique used or known in the art. The applied coating may then be passed through a magnetic field to orient the magnetic particles therein in a desired direction. In the apparatus of FIGURE 2, the magnetic field is produced by two opposed magnets 35 above and below the base 23.

After orienting the magnetic particles, the coating is dried in a dryer 36 by evaporating the solvent therefrom. The dryer is generally kept at about 100° C. but this temperature may be varied depending on the time this tape is in the dryer and on the solvent used. The dried coated base may then be wound on the take-up roller 31. No separate curing step is necessary subsequent to drying before the coating can be wound. The wound roll is then allowed to cure at room temperature and in normal atmosphere for about 24 hours before it is ready for use. The coated base may be slit to any desired width.

EXAMPLE 7

A coating mixture 34 is prepared by charging in a sand mill 21.36 grams of the prepolymer solution prepared in Example 1, 25 grams of dry, small particle size acicular gamma iron oxide (IRN135 manufactured by Charles Pfizer Co. Inc.), 22 grams of dry methylethyl ketone and 70 milliliters of glass beads (ceramedia, 18–25 mesh manufactured by Quakenbush Co.). The charge is milled for 6 hours under a moisture-free, nitrogen atmosphere. The coating mixture thus formed is filtered to separate the glass beads from the mixture. The moisture-free coating mixture 34 is then applied on a 1.5 mil Mylar base 23 or tape support by passing the base 23 under a doctor blade 33 which has a quantity of coating mixture 34 behind it to form a coating thereon. The applied coating is then passed between opposed magnets 35 to orient the magnetic particles therein. It then passes through a dryer 36 in which the coating is dried to remove the solvent therefrom and the tape is allowed to moisture-cure under atmospheric environment for one day. If desired the tape may be wound on a take-up roller 31 subsequent to drying and cured thereon. The properties of the magnetic recording tape thus formed are as follows: thickness 0.346 mil; coercivity 350 oersteds; retentivity 950 gauss; flux at 1000 oersteds 1215 gauss; *Br/Bs* 0.78; surface texture smooth and glossy. A reference tape prepared under similar conditions but using a 1980 molecular weight isocyanate terminated prepolymer prepared by reacting 2 moles of tolylene diisocyanate with 1 mole of a polytetramethylene ether glycol instead of the featured tertiary amine containing prepolymer had the following properties: thickness 0.353 mil; coercivity 340 oersteds; retentivity 775 gauss; flux at 1000 oersteds 1075 gauss; *Br/Bs* 0.72. Final curing of this tape took several days at atmospheric conditions and the tape could not be handled for about one day after coating.

EXAMPLE 8

A coating mixture is prepared by the technique described in Example 7. The charge to be milled consists of 31.5 grams of the featured prepolymer solution prepared as in Example 3, 40 grams acicular chromium dioxide, 60 grams 1,1,2-trichloroethane and 120 milliliters of glass beads. The coating mixture thus formed is then used in the coating process described in Example 7. The properties of the resulting magnetic recording tape are as follows: thickness 0.400 mil; coercivity 255 oersteds; retentivity 1700 gauss; flux at 1000 oersteds 1855 gauss; *Br/Bs* 0.92; resistivity $3.6\times10^{10}$ ohm sq.

EXAMPLE 9

The same general procedure is followed as in Example 8 except that 1.01 grams of α,α'-dichloro-p-xylene is included in the charge forming the coating mixture. This compound causes the formation of ionic sites on the prepolymer and final elastomer coating by quaternizing a proportion of the tertiary amine functions. These ionic sites are believed responsible for the improved lower surface resistivity of the tapes. It has also been found that retentivity of $CrO_2$ magnetic tapes are increased by the addition of the quaternizing compound. The properties of the magnetic recording tape thus formed are as follows: thickness 0.471 mil; coercivity 250 oersteds; retentivity 1825 gauss; flux at 1000 oersteds 1975 gauss; *Br/Bs* 0.92; resistivity $1.5\times10^{8}$ ohm sq. The preferred molar ratio of quaternizing agent to piperazine containing prepolymer has been found to be ½ so that half of the tertiary amine functions become quaternary ammonium groups.

EXAMPLE 10

A coating mixture is prepared by the technique described in Example 7. The charge to be milled consists of 23.2 grams of the featured prepolymer solution prepared in Example 4, 40 grams of acicular zinc ferrous ferrite, 50 grams of 1,1,2-trichlorethane and 95 milliliters of glass beads. The coating mixture thus formed is then used in the coating process described in Example 7. The properties of the magnetic recording tape thus formed are as follows: thickness 0.431 mil; coercivity 290 oersteds; retentivity 1560 gauss; flux at 1000 oersteds 1920 gauss; *Br/Bs* 0.81.

Figure 3:
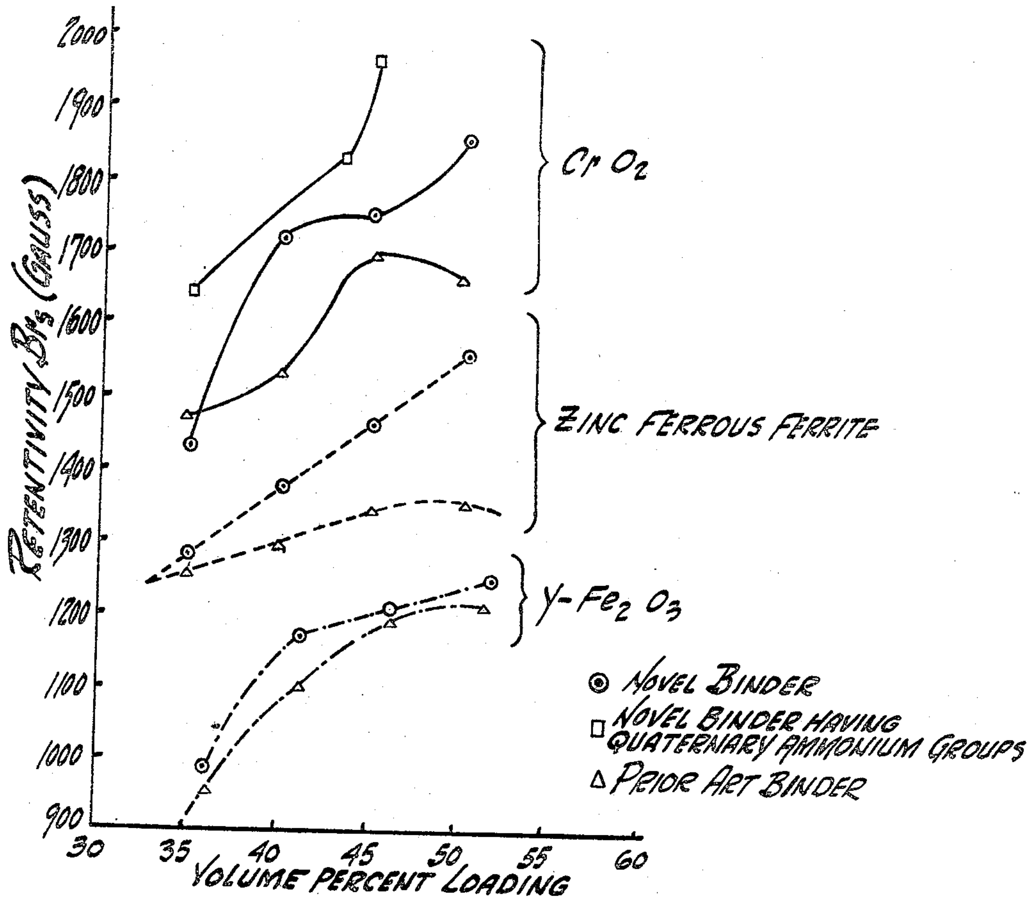
FIGURE 3 is a series of curves showing retentivity vs. volume percent loading of various magnetic recording elements.

FIGURE 3 is a series of curves showing the retentivity versus volume percent loading of novel magnetic recording elements as compared to prior art magnetic recording elements. The prior art recording elements employ diisocyanate derived binders. The curves illustrated, represent magnetic recording elements wherein the magnetic particles are chromium dioxide ($CrO_2$), a zinc ferrous ferrite, and gamma iron oxide ($\gamma$-$Fe_2O_3$). The curves illustrate that magnetic recording elements using these magnetic particles, dispersed in a prior art diisocyanate-derived binder, show a maximum retentivity at or less than 50 volume percent loading. In comparison, magnetic recording elements having the same magnetic particles dispersed in the featured tertiary amine-containing diisocyanate-derived binder generally have higher retentivities at any given volume percent loading than prior art recording elements. In addition, the maximum retentivity of these novel magnetic recording elements lies above 50 volume percent loading.

FIGURE 3, top curve also evidences the increase in retentivity observed in magnetic tapes having $CrO_2$ as the magnetic particles therein when the featured diisocyanate-derived binder contains a proportion of quaternary ammonium groups in addition to tertiary amine functions.

What is claimed is:

1. A magnetic recording element comprising a base and a coating upon a surface of said base, said coating consisting essentially of magnetic particles in a polymeric binder derived from a surface-active tertiary amine-containing diisocyanate terminated prepolymer, the molecules of said binder being constituted of interconnected units containing at least one tertiary amine function.

2. The recording element of claim 1 wherein said units have an average molecular weight of from 300 to 8000.

3. The recording element of claim 1 wherein the tertiary amine function is derived from a tertiary amine-containing compound selected from the group consisting of 1,4-bis(2-hydroxyethyl)-piperazine, substituted 1,4-bis (2-hydroxyethyl)-piperazine, 1,4-bis(2-hydroxypropyl)-2-methylpiperazine, O,O′-diethyl - N,N′ - bis(2-hydroxyethyl)-aminomethylphosphonate, and N-methyldiethanolamine.

4. The recording element of claim 1 wherein a proportion of said interconnected units contain quaternary nitrogen groups.

5. The recording element of claim 4 wherein said quaternary nitrogen groups are produced by the reaction of α,α′-dichloro-p-xylene with a fraction of the tertiary amine functions in said interconnected units.

6. The recording element of claim 1 wherein the magnetic particles consist essentially of acicular magnetic particles of the oxidic type between 0.2 and 2.0 microns long with an average length-to-width ratio in the range of about 2:1 to 20:1.

7. The recording element of claim 1 wherein said interconnected units are represented by the formula:

$$-\left[NX-\left(R-NH-\overset{O}{\overset{\|}{C}}-O-(B)_n-E-(B)_n-O-\overset{O}{\overset{\|}{C}}-NH\right)_m-(R-NX-Y)_t\right]-$$

wherein:

(1) E is a radical of low molecular weight containing at least one tertiary amine function, (2) B is a bivalent radical selected from the group consisting of alkylene radicals, alkylene-ether radicals, alkylene-arylene-ether radicals, alkylene-thioether radicals, alkylene-arylenether-thioether radicals, ester radicals and esteramide radicals, (3) R is a bivalent, nonpolymeric, organic radical which is inert to isocyanate groups and which is selected from the group consisting of aromatic, aliphatic and cycloaliphatic radicals and combinations thereof, (4) X is at least one radical selected from the group consisting of hydrogen radical and bivalent radicals consisting of nonpolymeric dicarbamyl radicals and of polymeric dicarbamyl radicals where said polymeric dicarbamyl radical consists essentially of units having the general formula:

$$-\overset{O}{\overset{\|}{C}}-NH-\left(R-NH-\overset{O}{\overset{\|}{C}}-O-(B)_n-E-(B)_n-O-\overset{O}{\overset{\|}{C}}-NH\right)_m-R-NH-\overset{O}{\overset{\|}{C}}-$$

(5) Y is a bivalent radical selected from the group consisting of carbonyl radicals, non-polymeric diacyl radicals and nonpolymeric dicarbamyl radicals, (6) *n* is an integer from 1 to 50, (7) *m* and *t* are integers and the ratio of *m*:*t* is in the range from 1:1 to 1000:1, and (8) C, N, H and O are carbon, nitrogen, hydrogen and oxygen respectively.

8. The recording element of claim 1 wherein said tertiary amine-containing interconnected units are represented by the formula:

$$-\left[NX-\left(\left[R-NH-\overset{O}{\overset{\|}{C}}-O-(B)_n-O-\overset{O}{\overset{\|}{C}}-NH\right]_m-R-NH-\overset{O}{\overset{\|}{C}}-O-E-O-\overset{O}{\overset{\|}{C}}-NH-\right)_p-\left[R-NH-\overset{O}{\overset{\|}{C}}-O-(B)_n-O-\overset{O}{\overset{\|}{C}}-NH\right]_m-\left[R-NX-Y\right]_t\right]-$$

wherein (1) E is a radical of low molecular weight containing at least one tertiary amine function, (2) B is a bivalent radical selected from the group consisting of alkylene radicals, alkylene ether radicals, alkylene-arylene ether radicals, alkylene-thioether radicals, alkylene-arylenether-thioether, radicals, ester radicals and esteramide radicals, (3) R is a bivalent, nonpolymeric, organic radical which is inert to isocyanate groups and which is selected from the group consisting of aromatic, aliphatic and cycloaliphatic radicals and combinations thereof, (4) X is at least one radical selected from the group consisting of hydrogen radical and bivalent radicals consisting of nonpolymeric dicarbamyl radicals and of polymeric dicarbamyl radicals where said polymeric dicarbamyl radical consists essentially of units having the general formula:

$$-\overset{O}{\overset{\|}{C}}-NH-\left(\left[R-NH-\overset{O}{\overset{\|}{C}}-O-(B)_n-O-\overset{O}{\overset{\|}{C}}-NH\right]_m-R-NH-\overset{O}{\overset{\|}{C}}-O-E-O-\overset{O}{\overset{\|}{C}}-NH\right)_p-\left[R-NH-\overset{O}{\overset{\|}{C}}-O-(B)_n-O-\overset{O}{\overset{\|}{C}}-NH\right]_m-R-NH-\overset{O}{\overset{\|}{C}}-$$

(5) Y is a bivalent radical selected from the group consisting of carbonyl radicals, non-polymeric diacyl radicals and non-polymeric dicarbamyl radicals, (6) *n* is an integer from 1 to 50, (7) *m*, *p* and *t* are integers and the ratio of *p*:*t* in the range of from 1:1 to 1000:1, and (8) C, N, H and O are carbon, nitrogen, hydrogen and oxygen respectively.

References Cited

UNITED STATES PATENTS

| | | | |
|---|---|---|---|
| 2,866,762 | 12/1958 | Brochhagen et al. | 260—77.5 X |
| 3,105,063 | 9/1963 | Damusis | 260—77.5 |
| 3,144,352 | 8/1964 | Talley | 117—161 X |
| 3,149,995 | 9/1964 | Bauer | 252—62.54 X |
| 3,150,995 | 9/1964 | Bauer | 117—138.8 |
| 3,242,005 | 3/1966 | Morita et al. | 117—161 X |
| 3,281,397 | 10/1966 | Axelrod | 117—161 X |
| 3,294,724 | 12/1966 | Axelrood | 117—161 X |
| 3,294,752 | 12/1966 | Wilkinson | 260—77.5 |
| 3,395,129 | 7/1968 | Dieterich et al. | 260—77.5 |

WILLIAM D. MARTIN, Primary Examiner

B. PIANALTO, Assistant Examiner

U.S. Cl. X.R.

117—138.8, 161, 236, 238, 240